US005307056A

United States Patent [19]
Urbanus

[11] Patent Number: 5,307,056
[45] Date of Patent: Apr. 26, 1994

[54] DYNAMIC MEMORY ALLOCATION FOR FRAME BUFFER FOR SPATIAL LIGHT MODULATOR

[75] Inventor: Paul M. Urbanus, Dallas, Tex.

[73] Assignee: Texas Instruments Incorporated, Dallas, Tex.

[21] Appl. No.: 755,883

[22] Filed: Sep. 6, 1991

[51] Int. Cl.⁵ .............................................. G09G 1/02
[52] U.S. Cl. ...................................... 340/189; 345/196; 345/200
[58] Field of Search ............... 340/799, 750, 783, 784, 340/798

Primary Examiner—Ulysses Weldon
Assistant Examiner—Matthew Luu
Attorney, Agent, or Firm—James C. Kesterson; Richard L. Donaldson

[57] ABSTRACT

A frame buffer for a spatial light modulator in a image display system. The frame buffer is comprised of video random access memory devices (VRAM's) having sections of VRAM rows that receive a value from one bit position of all display rows. An allocation circuit provides addresses for filling said VRAM rows when data is being written to the frame buffer, updates an address memory as VRAM rows are emptied, and provides addresses for mapping VRAM rows to display rows of the spatial light modulator when data is being read out of the frame buffer.

14 Claims, 6 Drawing Sheets

DYNAMIC MEMORY ALLOCATION FOR FRAME BUFFER FOR SPATIAL LIGHT MODULATOR

RELATED PATENT APPLICATIONS

The following patent applications are related to the present application, and are incorporated by reference herein:

U.S. Ser. No. 678,761, "DMD Architecture and Timing for Use in a Pulse-Width Modulated Display System"

U.S. Ser. No. 756,007, "DMD Display System Controller"

U.S. Ser. No. 755,981, "Data Formatter with Orthogonal Input, Output, and Spatial Reordering"

U.S. Ser. No. 756,026, "Partitioned Frame Memory for Spatial Light Modulator"

TECHNICAL FIELD OF THE INVENTION

This invention relates to video display systems, and more particularly to those using spatial light modulators.

BACKGROUND OF THE INVENTION

A recent development in video display systems is the use of spatial light modulators, to take the place of raster-scan electronic beam devices. These modulators consist of an array of electronically addressable pixel elements. For display, light from each pixel is magnified and projected to a display screen by an optical system. The type of modulation depends on how the modulator is combined with an optical system.

A frequently used type of spatial light modulator is the deformable mirror device, in which each pixel element is a tiny mirror, each capable of separate mechanical movement in response to an electrical input. Incident light may be modulated in direction, phase, or amplitude by reflection from each pixel element.

For many applications, the spatial light modulator is binary in the sense that each pixel element may have either of two states. The element may be off, which means that it delivers no light. Or, the element may be on, which means that it delivers light at a maximum intensity. To achieve a viewer perception of intermediate levels of light, various pulse width modulation techniques may be used. These techniques are described in pending U.S. Pat. Ser. No. 678,761, entitled "DMD Architecture and Timing for Use in a Pulse-Width Modulated Display System".

Pulse width modulation uses various schemes for loading the modulator, including "bit-frame" loading, in which one bit per pixel for an entire frame is loaded at one time. Thus, for example, for 8-bit pixel resolution, the modulator is loaded eight times per frame, one pixel per frame at a time, with the load timing determined by the particular modulation technique being used. Several such methods are described in U.S. Pat. Ser. No. 678,761, entitled "DMD Architecture and Timing for Use in a Pulse-Width Modulated Display System". In those methods, the most significant bit is loaded for $\frac{1}{2}$ of a frame period, the second most significant bit for $\frac{1}{4}$, frame period, etc. The loading occurs in bit-frame bursts, during a "least significant bit-time" which is calculated by dividing the total frame-time into $2^n - 1$ least significant bit-times, where n is the resolution of each bit. Either the bit-frame representing the least significant bit or the most significant bit may be loaded first, depending on the method being used.

Implementation of pulse width modulation requires the use of a frame buffer for incoming data. Because the modulator receives data in bit-frames, it is necessary for the frame buffer to receive an entire image before transferring data to the modulator. The frame buffer must permit one frame to be transferred to the modulator while the next frame is being input to the frame buffer. The most straightforward approach to providing a sufficiently large frame buffer is to provide memory space for two complete frames. In a two-frame memory, while the first part of the memory is being filled with the data from the incoming frame, the stored data from the previous incoming frame is being transferred from the second part of the memory to the spatial light modulator. After all of the data for the incoming frame has been stored into the first part of the memory, this data is transferred to the spatial light modulator while the next frame of incoming data is being stored into the second part of the memory. Thus, the two parts of the memory operate in a "ping-pong" manner, with each part alternating, on a frame-by-frame basis, between receiving incoming data and outputting data to the spatial light modulator. However, because this approach is expensive, a need exists for a means to decrease the required memory size.

SUMMARY OF THE INVENTION

One aspect of the invention is a projection circuit for storing and displaying data representing rows and columns of a graphic image. A spatial light modulator receives data from a frame buffer. This data represents rows of an image, and the light modulator reproduces the image from the data. The frame buffer is a video random access memory, which has control and addressing lines such that said data may be read into sections of memory rows, wherein each of the sections stores data representing one bit-frame of data. A memory allocation circuit dynamically allocates memory rows of the video random access memory. The allocation circuit has a first-in first out (FIFO) memory for storing a list of available memory rows, a mapping memory for mapping memory rows to display rows of said spatial light modulator, and a controller for fetching available memory rows from the FIFO memory, and for controlling the filling of memory rows, and for saving filled memory row addresses in the mapping memory. The mapping memory is in communication with the FIFO, such that as a memory row is downloaded into the spatial light modulator and is consequently available for re-use, its address is placed in the FIFO. Other components of the allocation circuit include a switch for providing a memory address to the frame memory, with the address depending on whether the memory is to be loaded with incoming display data or downloaded to said spatial light modulator. An input bit selector selects a memory row in accordance with the current bit position from each current pixel being read in. An input row counter and an input column counter provide an address in the frame memory when data is being loaded into the memory. Address data from an output bit selector and an output row counter are combined to provide an index into a mapping table. Subsequent mapping table output provides the correct row address in the memory when data is being downloaded from the memory.

A technical advantage of the invention is that the amount of memory required for a frame buffer in a spatial light modulator projection system is substantially reduced.

DETAILED DESCRIPTION OF THE INVENTION

Figure 1:
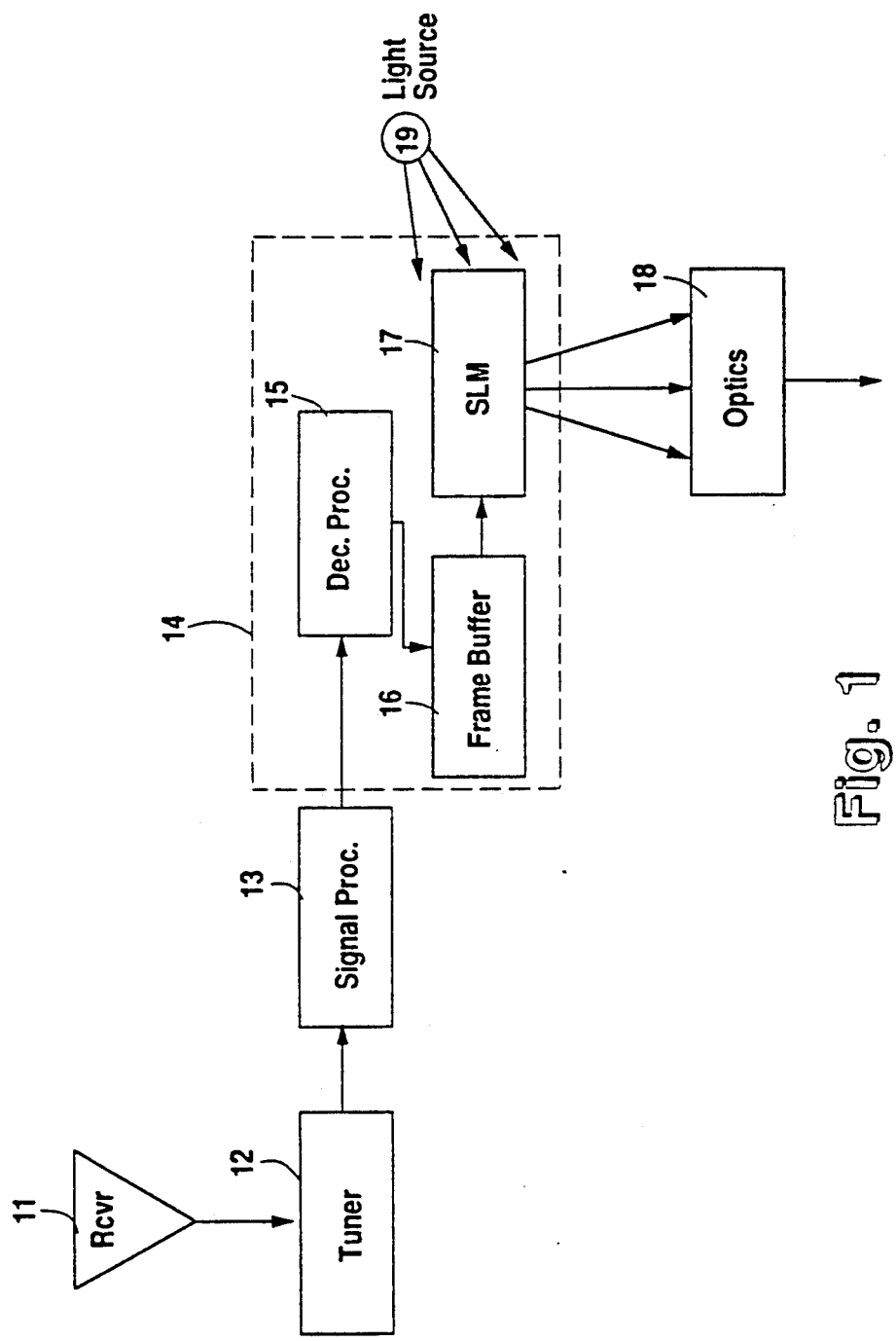
FIG. 1 illustrates a receiver and projection display unit for a video display unit using spatial light modulation.

FIG. 1 illustrates a video display system, with which the invention may be used. This system is only one application of the invention, and other applications may be implemented using the same concepts described below. For example, rather than a video signal, the projection unit 14 of FIG. 1 could be part of a printer system or any other system in which an incoming signal representing image data is to be received and operated on.

A specific example of the video display system of FIG. 1, and the example used throughout this description, is a television display system. A receiver 11 receives a television signal of some standardized format and passes it to tuner 12, which splits the signal into an audio and a video component. The audio portion of the signal will not be considered further herein. Tuner 12 passes the signal to a signal processor 13 for analog-to-digital conversion and other enhancements. The enhanced digital signal is then sent to projection system 14, which contains a decimation processor 15, a frame buffer 16, and a spatial light modulator (SLM) 17. The decimation processor 15 converts the signal to a form suitable for storage in frame buffer 16. Frame buffer 16 delivers the data, row-by-row, in bit-frames to SLM 17. SLM 17 receives light from a source 19, and generates an image via optics unit 18 for display to a viewer. In a sequential color system, a color image is provided by changing the color incident on or reflected by the SLM 17.

For purposes of example herein, the incoming display data is assumed to be an National Television Standards Committee (NTSC) signal, having samples for 480 rows and 640 columns of pixels. Each pixel is represented by 24 bits of data. This data represents red-blue-green data, where each color is represented by 8 bits.

An example of a decimation processor 15 for providing data samples is described in U.S. Pat. Ser. No. 755,981, entitled, Data Formatter with Orthogonal Input, Output, and Spatial Reordering. Other applications may use other types of processors, however, a common characteristic is the providing of digital data for frame buffer 16. Decimation processor 15 reformats incoming data so that it may be read into frame buffer 16 in a manner that permits bit-frames to be read out from frame buffer 16. A data format used for dynamic memory allocation is described herein.

Frame buffer 16 is comprised of video random access memory (VRAM) devices. These VRAM devices solve the problem of access to a high resolution frame buffer by including an internal parallel-in/serial-out shift register that can be accessed independently from the rest of the memory unit. In one memory cycle, an entire row of pixel data is transferred from memory to the shift register. During read-out from the shift register, the memory is free to be read into.

An example of a VRAM device is the TMS4161 integrated circuit, manufactured by Texas Instruments, Inc. The shift register is as wide as the memory array and can be parallel loaded by asserting a transfer signal while a row of memory is being read. The serial register has its own data clock, enabling it to transfer data out of the chip at high speeds. Other VRAM type devices may be used, with the essential characteristic being a configuration similar to a RAM, but with a parallel-in/serial-out data register connected to a second data port.

Where standard commercially available VRAM devices are used, the size and number of devices needed are determined by factors such as the size of the pixel array and the required parallel data output. A specific VRAM configuration, suitable for the bit format of this description is described in connection with FIGS. 2 and 5.

SLM 17, is for purposes of this description, a deformable mirror device (DMD). As explained in the background of this patent application, these are binary devices, which may be modulated to provide the viewer with a perception of varying intensity or with color. An example of SLM 17 is the DMD device manufactured by Texas Instruments, Inc., in which each pixel mirror is associated with a memory cell having at least 1 bit of data storage, and all pixel elements are simultaneously switched.

However, the invention is not limited to the use of DMD's for SLM 17, and may be used with other binary spatial light modulators having addressable pixel elements. A characteristic of a suitable SLM 17 is that its loading occurs a row at a time. Because the data stored in rows of SLM 17 are not necessarily coincident with rows of data in frame buffer 16, the former data are referred to in terms of "display rows" as opposed to "VRAM rows" when appropriate for clarity.

Figure 2:
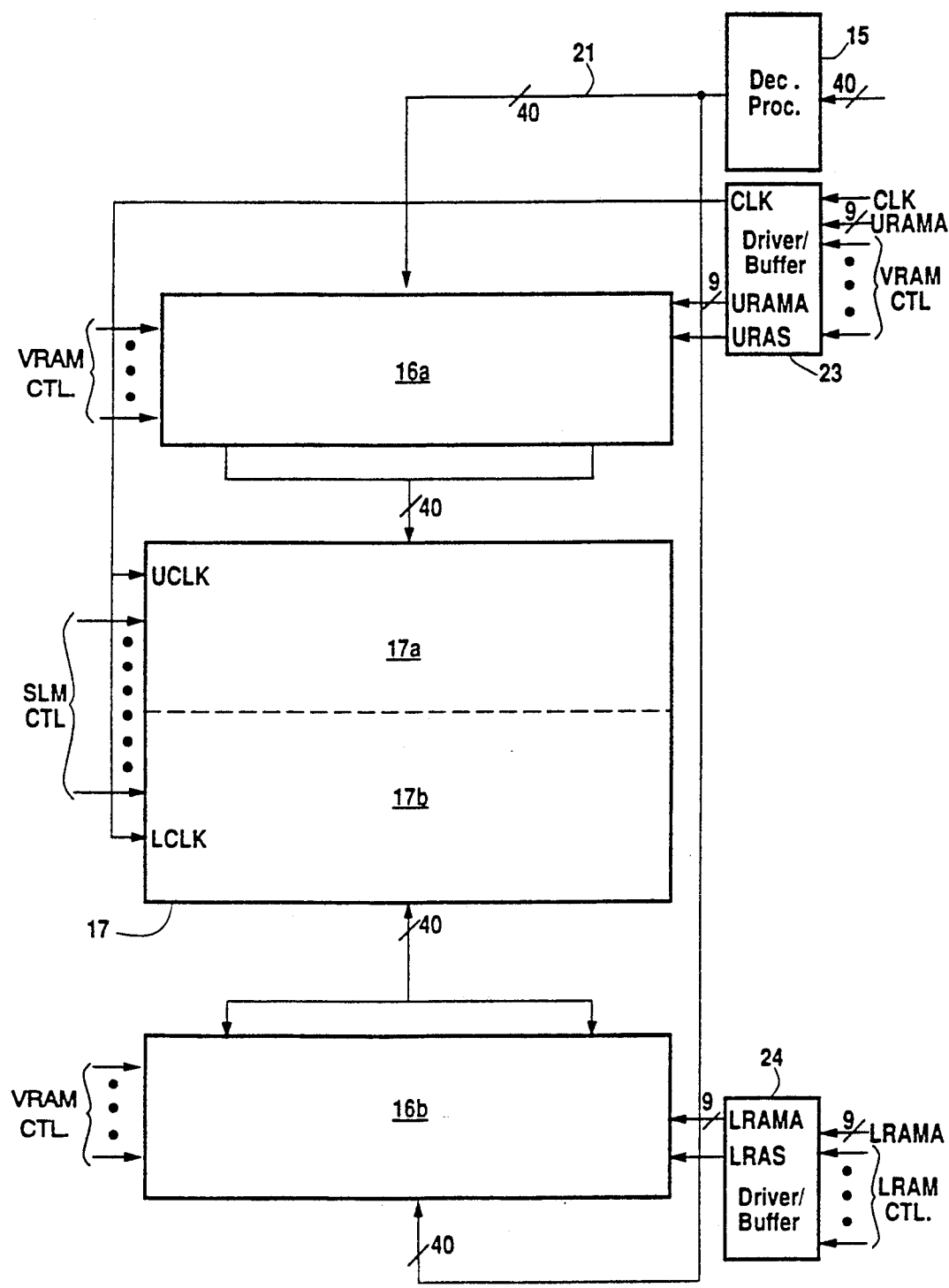
FIG. 2 illustrates the frame buffer and spatial light modulator of FIG. 1, and related control signals for the frame buffer.

FIG. 2 illustrates frame buffer 16 and SLM 17 in further detail. Frame buffer 16 is partitioned into two parts, an upper frame buffer 16a and a lower frame buffer 16b. The details and advantages of this partitioning are discussed in U.S. Pat. Ser. No. 756,026, entitled "Partitioned Frame Memory for Spatial Light Modulator". That patent application also describes the various control signals used to drive frame buffer 16. Frame buffer 16 need not be partitioned or could be partitioned in other configurations. These variations would not change the concepts described herein, and implementation of the memory allocation would primarily involve modifications to the control and addressing signals of the frame buffer.

For a 640×480 pixel image, upper frame buffer 16a receives the upper 240 rows of video data, and lower frame buffer 16b receives the lower 240 rows. Video data is stored into upper buffer 16a and lower buffer 16b one line at a time. Thus, only one of the upper or lower buffers 16a or 16b is loaded at any given time.

In the example of this description, SLM 17 is a 640×480 pixel array to match the rows and columns of the sampled incoming data. However, the concepts described herein could be implemented with any size array, with appropriate changes being made to the data widths described herein.

SLM 17 is divided into an upper part 17a and lower part 17b. Although data is loaded into upper and lower frame buffers 16a and 16b at different times, output data from frame buffer 16 is loaded into SLM 17 simultaneously into upper part 17a and lower part 17b. In the example of this description, the output from frame buffer 16 is delivered to SLM 17 in two sets of 40 lines, each line carrying one bit. One set of data lines is loaded to upper part 17a and the other set to lower part 17b.

Figure 3:
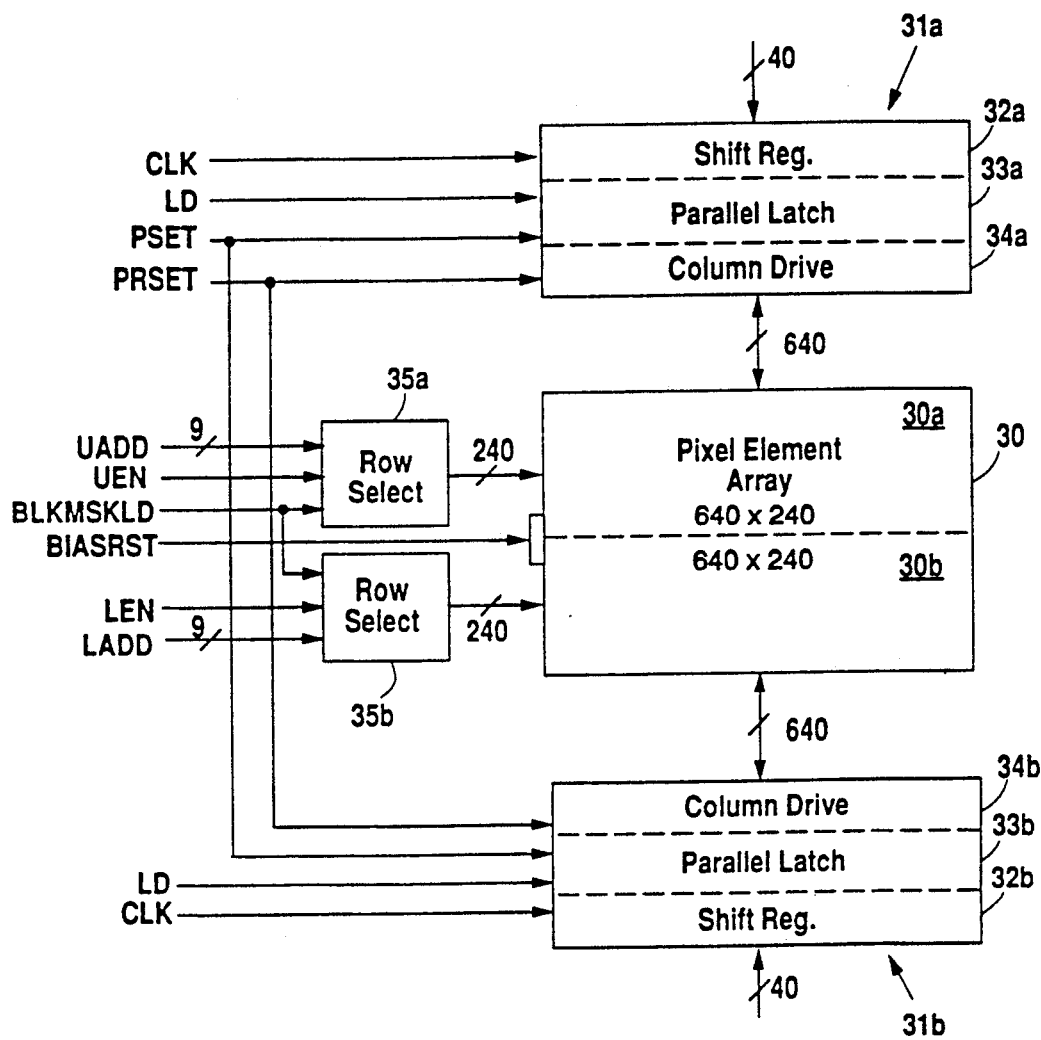
FIG. 3 illustrates a spatial light modulator having an upper and a lower pixel element array, each associated with an input unit and related control signals.

FIG. 3 illustrates SLM 17 in further detail. It receives data from upper and lower frame buffers 16a and 16b, simultaneously, into 40 16-bit shift registers associated with upper part 17a and into 40 16-bit shift registers associated with lower part 17b. Thus, the data connections to these two parts 17a and 17b are each 40 bits wide.

Upper part 17a and lower part 17b of SLM 17 each have an input unit 31a and 31b. Each input unit 31a and 31b has a shift register layer 32a and 32b, parallel latch 33a and 33b, and column driver 34a and 34b. Shift registers 32a and 32b receive the two sets of the 40-bit wide data word from frame buffer 16. Each wire from frame buffer 16 is associated with one of 40 16-bit shift registers. For a 640-column image, after 16 clock cycles, an entire display row is stored in each shift register layer 32a and 32b.

Shift register layers 32a and 32b are controlled by a common clock signal (CLK).

After shift register layers 32a and 32b are loaded, they each transfer their row of data to parallel latches 33a and 33b in a single clock cycle. Parallel latches 33a and 33b are configured as 40 blocks, each storing 16 bits of data. While data is latched and is subsequently being stored in a selected row of pixel element array 30, the next row of data may be loaded into shift register layers 32a and 32b. Parallel latches 33a and 33b are controlled by common load, set, and reset signals (LD, PSET, and PRESET) Column drivers 34a and 34b drive 1 bit of row data to each column of pixel element arrays 30a and 30b.

Upper pixel element array 30a and lower pixel element array 30b are each in communication with a row selector 35a and 35b. Row selectors 35a and 35b are simple decoders, which each receive 9 bits of address data (UADD and LADD), which represent one of 240 rows to be filled in the respective array halves 30a and 30b.

Thus, to fill all pixel elements of mirror array 30 of SLM 17, requires 16 clock cycles per row × 240 rows. Once all pixel memories of both upper and lower mirror arrays 30a and 30b have been loaded, the states of the pixels change according to the stored data, simultaneously, in response to a common reset signal (BIASRST).

As explained above, frame buffer 16 has two sets of 40 output pins, each set delivers data to either input unit 31a or and 31b of SLM 17. If conventional "double-buffering" techniques were used, the depth of memory behind each pin would be calculated as the number of bits/pixel (24) times the number of rows (480) times the number of pixels/row (640) divided by the number of pins (40) times 2 frames. Where SLM 17 is divided into two parts, this product is further divided by two. As indicated by the values in parentheses, using 24-bit pixels, 640-bit rows, and 40 pins for each of the upper and lower parts the required memory depth would be 184,320 bits per pin for two complete frames.

However, as explained below, if memory is dynamically allocated, because frame buffer 16 is loaded and unloaded at the same time, it need not be two frames large.

Figure 4:
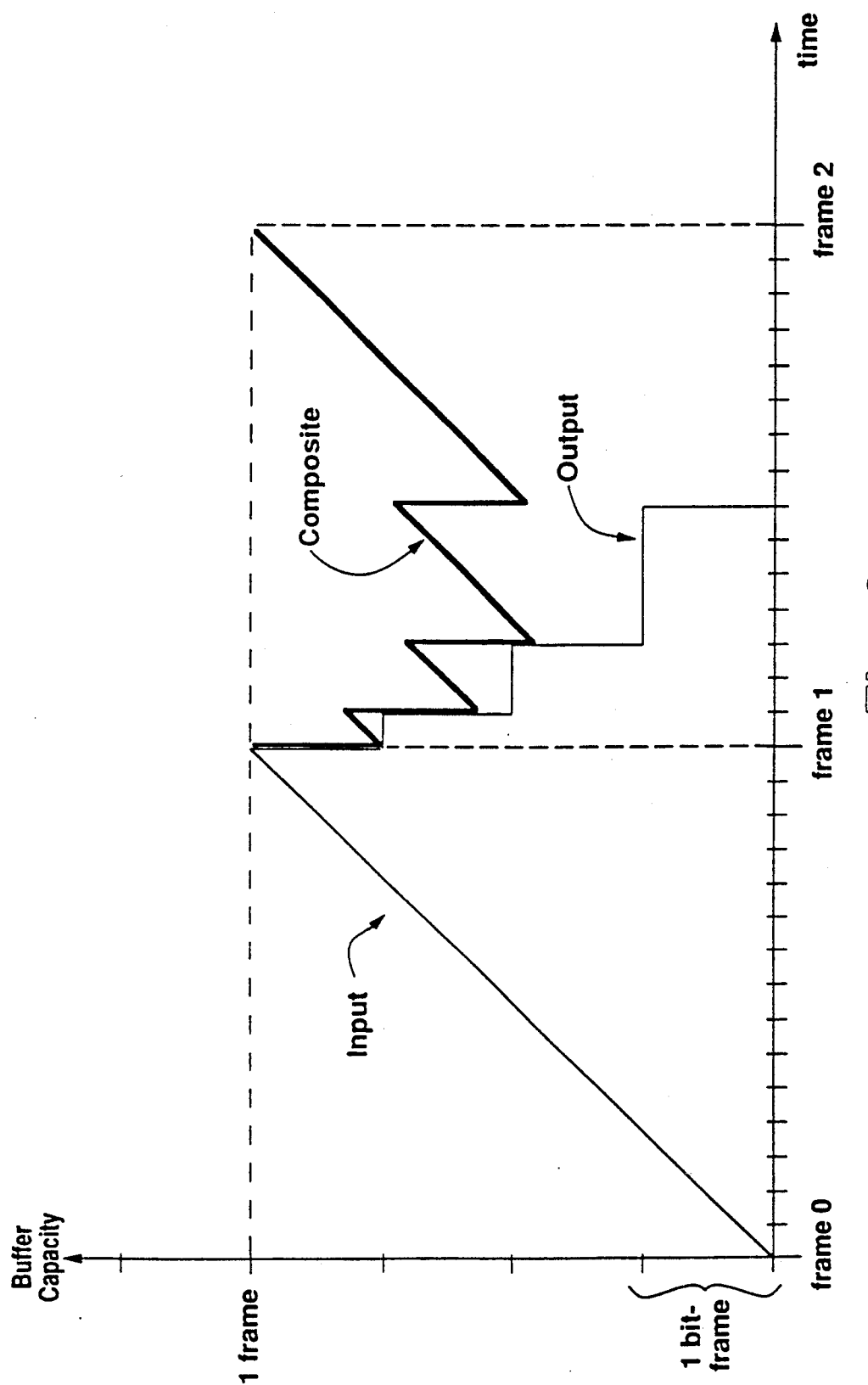
FIG. 4 illustrates the size of the contents of the frame buffer as it is loaded and unloaded.

FIG. 4 illustrates how frame buffer 16 is filled as incoming display data is loaded from a data source, and how it is emptied as output data is downloaded to SLM 17. FIG. 4 also illustrates the actual composite memory usage graph for simultaneous loading and unloading.

For purposes of example in FIG. 4, it is assumed that the pixel resolution is 4 bits, which means that there are 4 bit-frames and that there are $2^4 - 1 = 15$ LSB-times in each frame-time. It is also assumed that loading is at a nearly constant rate, which is a fair approximation for the 40-bit input described above. In the illustration of FIG. 4, frame buffer 16 is not partitioned, and thus receives the entire frame. For a partitioned frame buffer 16, each of n parts would receive 1/n frame at a constant rate.

As shown in FIG. 4, the loading of frame buffer 16 occurs at a linear rate, which is the same as that of the incoming data. When pulse width modulation (PWM) is implemented, the unloading of frame buffer 16 occurs at a logarithmic rate.

For example, on the input side, data is loaded at a data rate of one word per memory cycle. The loading for a first frame would be as illustrated by the "input" diagram from a frame 0 to frame 1, where no simultaneous downloading occurs. Subsequent loading is illustrated by the composite graph as explained below.

The output side is illustrated by the "output" diagram from frame 1 to frame 2. Frame buffer 16 is unloaded at a rate of one bit-frame in a first least significant bit (LSB)-time, another bit-frame in a second LSB-time, etc. The time that elapses between LSB-times is determined by the particular PWM technique being used. For purposes of illustration, it is assumed that unloading is instantaneous, which is a fair approximation for the high "burst rate" when one bit-frame is emptied in one LSB-time.

Thus, after frame 0, as each frame is loaded into frame buffer 16, the preceding frame is downloaded to SLM 17 in 4 bit-frames. The bit-frame containing the LSB of all pixels, i.e., the "least significant bit (LSB)-frame", is downloaded first during a first LSB-time. This first state is held for 1 LSB-time, then the second LSB-frame is downloaded and its state is held for 2 LSB-times. Then, the third LSB-frame is unloaded and its state is held for 4 LSB-times. Finally, the bit-frame containing the most significant bit is downloaded and its state is held for 8 LSB-times. Thus, unloading occurs at a high initial rate for each bit-frame and continues at incrementally lesser rates until the an entire frame of 4-bit pixel data is downloaded.

The composite memory use graph of FIG. 4 illustrates the actual memory use during simultaneous loading and unloading. As shown, sufficient memory space may be made available for loading incoming data for a current frame while downloading data for the preceding frame, without the need for two complete frame spaces. An underlying theory of the invention is that memory may be dynamically allocated such that incoming data uses space emptied by data being downloaded. After each download burst, memory use resumes at the same input rate.

Although the example of FIG. 4 does not illustrate a memory usage that exceeds one frame size at any time, it is possible that this situation could occur. For example, if the pixel resolution were 8 bits, the input rate would double, and the input between more widely spaced output bursts might cause memory usage to exceed one frame size. Thus, in the preferred embodiment, frame buffer 16 is somewhat larger than one frame size. However, it is substantially smaller than two complete frame sizes.

In the preferred embodiment, for a frame size of 92.16 Kbits per frame, each half of frame buffer 16 is comprised of 128K×N VRAM's, where N is the number of output pins, rather than the 184K×N dimensions that would be required for storing two frames. Where frame buffer 16 is not partitioned, or is partitioned in other configurations, larger or smaller VRAM's could be used for each part of frame buffer 16. Regardless of partitioning, the memory space behind each pin is sufficient to store pixel data for at least one column of each row associated with that part, plus a margin of extra space if it is predicted that there will be instances when the total memory usage might exceed one frame.

In the example of this description, each VRAM is 128K×8 bits, such that each of 8 output bit-lines, i.e., "pins", has 512 rows with 256 bits per row of data behind it. This size is used for purposes of illustration, primarily because it is a standard commercially available size.

Figure 5:
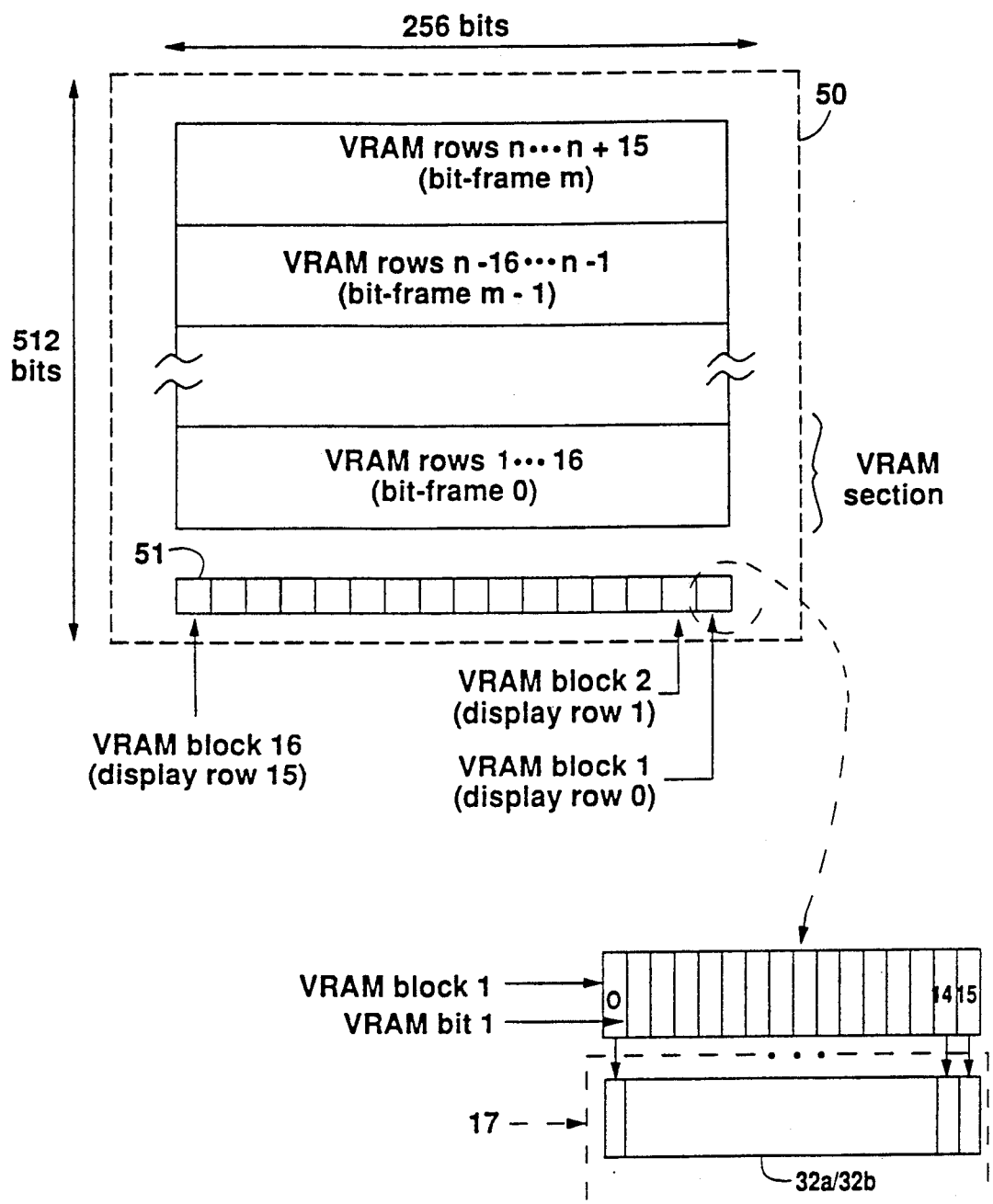
FIG. 5 illustrates the allocation of memory spaces for display pixels in the frame buffer.

FIG. 5 illustrates the organization of a first VRAM "layer" 50 of an 128K×8 VRAM used for frame buffer 16. For a 128K×8 VRAM, a "layer" is the 128K memory space associated with each pin. As explained below, each VRAM layer 50 holds data for a certain number of columns for all display rows for either the top or bottom part of SLM 17. Using the example of this description, each VRAM layer holds data for 16 columns of each of 240 rows. Where there are 640 columns per row, each part of frame buffer 16a and 16b has 40 VRAM layers 50. As illustrated, 512×256 bits of data storage space are behind the output bit-line of each VRAM layer 50. The output bit-lines of all VRAM layers 50 in frame buffer 16, operate in parallel to deliver data to SLM 17. The shift register 51 of each VRAM layer 50 is 256 bits wide to match the width of the VRAM. Shift register 51 is divided into 16 blocks to match the 16-bit input registers 32a and 32b of SLM 17. Each of these 16 blocks is associated with one of 16 different rows of display data. Each block contains data for 16 columns.

Thus, the number of VRAM layers 50, in terms of the number of output pins, and the configuration of the VRAM blocks, matches the configuration of the input units 31a and 31b of SLM 17. This is why for input units 31a and 31b, having 40 16-bit shift registers, for 640-column rows, 40 VRAM layers 50 are used for each half of frame buffer 16.

The 512 rows of each VRAM layer 50 are divided into sections of 15 rows each. These rows are referred to herein as "VRAM rows" to distinguish them from the rows of actual data to be displayed by SLM 17, i.e., the "display rows". Each VRAM row holds data representing one bit from each of 16 columns from each of 16 display rows.

Thus, for each 15-row section of upper or lower frame buffer 16, which is comprised of multiple VRAM layers 50, one bit from all 640 columns of 240 display rows is stored. This data is delivered to either the top or bottom part 17a or 17b of SLM 17.

Alternatively, if frame buffer 16 were not partitioned, each VRAM layer 50 could store data for all 480 rows, in which case each VRAM layer would be twice as large, with 30-row sections. This configuration would require a SLM 17 with appropriate modifications to permit one-sided loading, i.e., only one input unit would be used. Furthermore, if frame buffer 16 were partitioned into half-rows or other configurations, smaller VRAM layers 50 would be used, provided that appropriate addressing and control signals were used to load and download the data.

Using the example of this description, the process of inputting data in frame buffer 16 requires reformatting data from 24-bit pixel data, which arrives in a row r, column c, pixel p format, into a bit-frame format comprised of 24 bit-frames per image frame. Methods for accomplishing this reformatting are described in U.S. Pat. Ser. No. 755,981, entitled "Data Reformatter with Orthogonal Input, Output and Spatial Reordering".

Regardless of the reformatting method used, the location of data in frame buffer 16 has a format especially designed for dynamic allocation. Each 15-row section of VRAM rows represents 1 of 24 bit-frames. Thus, input data for each group of 16 display rows use 24 VRAM rows, and input data from the 15 groups of 16 display rows use 15×24=360 VRAM rows.

As an example of locating display data in frame buffer 16, display row 0, column 0, bit 0, is stored in VRAM layer 1, row 1, block 1, bit 1. Display row 0, column 0, bit 1 is stored in VRAM layer 1, row 16, block 1, bit 1. Display row 0, column 0, bit 24 is stored in VRAM layer 1, row 346, block 1, bit 1. Thus, each new bit of the pixel at row 0, column 0, is stored in one of 24 different VRAM rows.

The 24 bits of data for the next column position of row 0, i.e., display row 0, column 1, are stored in the same relative VRAM blocks as row 0, column 0, but in the next bit position of the block. Thus, display row 0, column 1, bit 0, is stored in VRAM row 1, block 1, bit 2.

Every group of 16 columns of row 0, is stored in a different VRAM layer. Thus, display row 0, column 17, bit 0 is stored in VRAM layer 2, row I, block 1, bit 1.

Data for the next display row are stored in new VRAM blocks. Row 1, column 0, bit 0, is stored in VRAM row 1, block 2, bit 1. The same VRAM row is used for 16 display rows; for each group of 16 display rows, a different VRAM row is used.

It should be understood that the above-described mapping is only one example to show relative positions of display rows, columns, and pixel bit positions, to VRAM layers, rows, blocks, and bits. The above example of loading frame buffer 16 in the preceding paragraph is directed to the configuration and addressing schemes of VRAM's that are commercially available today. Other loading sequences may be possible. However, the significant feature of the loading is that it permits display bit-frames to be mapped to VRAM rows, such that VRAM rows can be downloaded as bit-frames and the allocation circuit of FIG. 6 can monitor available VRAM rows as they are emptied.

In a conventional two-frame "ping-pong" memory scheme, the data for a given display row will typically reside at the same address in the memory. However, as explained below, a special allocation circuit supplies available VRAM row addresses, which may result in any given display row being mapped to a different VRAM row for successive frames. This allocation circuit uses the relative memory location scheme described above, in which, for every display bit increment, the VRAM row increments by 15. For every display column increment, the VRAM bit increments by one, and for every 16 columns, the VRAM layer increments by one. For every display row increment, the VRAM block increments by one. For every 16 display rows, the VRAM row increments by one.

For downloading data from frame buffer 16 to SLM 17, which is done in bit-frames, 16 bits of bit-frame data are read from each VRAM block. For display row 0, 16 bits of data are read from VRAM layer 1, row 1, block 1, and at the same time 16 bits are read from VRAM layer 2, row 1, block 1, etc., with all columns of display row 0 being read from the same relative VRAM row and block but from different VRAM layers, simultaneously.

For display row 1, 16 bits of data are read from VRAM layer 1, row 1, block 2, with each group of 16 columns being read from different VRAM layers. Each group of 16 display rows is read from a new VRAM row.

Figure 6:
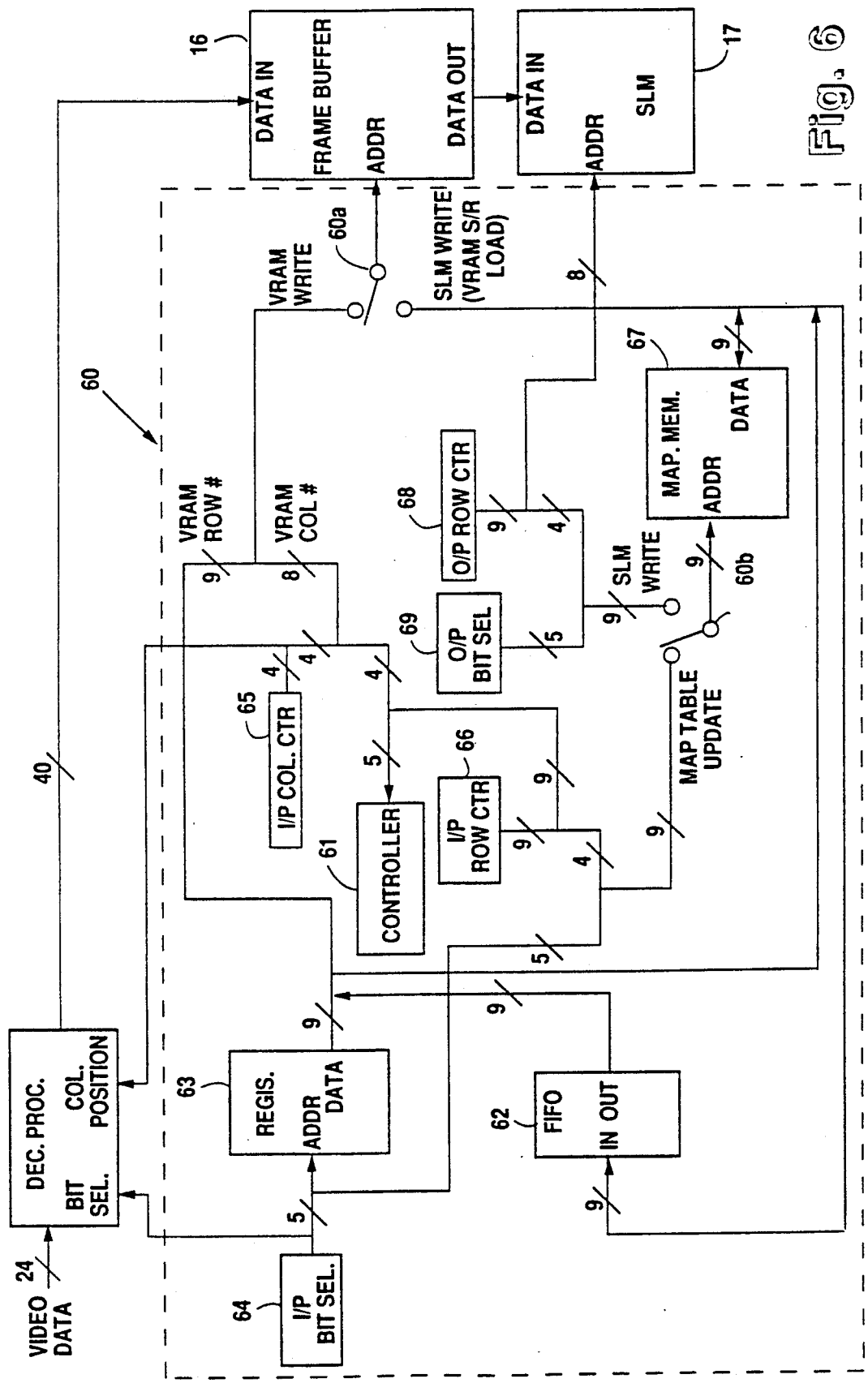
FIG. 6 illustrates a dynamic memory allocation circuit for reading data into and out of the frame buffer.

FIG. 6 illustrates a circuit 60 used to dynamically allocate memory for frame buffer 16. As explained below, allocation circuit 60 is comprised of a number of memory devices and counters, under control of a controller 61, which performs several functions. It fetches available VRAM rows from FIFO memory 62. It controls the filling of VRAM rows with input data. After each VRAM row is filled, it saves the VRAM row address in the proper location in mapping memory 67, so that data from frame buffer 16 may be directed to the proper location in SLM 17.

FIFO memory 62 contains a list of addresses of VRAM rows that are available to be loaded. It has a capacity of 512 VRAM row addresses, thus 9 bits are needed for each address.

A temporary register 63 holds 24 9-bit addresses, which it obtains from FIFO memory 62, and which represent the next 24 VRAM row addresses to be used. Each VRAM row address represents the beginning of a VRAM row for storing 16 display rows. Register 63 may be implemented from a standard random access memory device.

Which one of the 24 VRAM row addresses in register 63 is to be used depends on which bit-frame is to be loaded, i.e., which of bit positions 0-23 is selected. This selection is made by input bit selector 64. Input bit selector 64 is also in communication with decimation processor 15.

Once a bit is selected and the corresponding VRAM row is determined, a relative VRAM column position, 0-15, is determined from the output of a input column counter 65 and input row counter 66. The VRAM column number is represented by an 8-bit address, in which the 4 least significant bits are from input column counter 65 and the 4 most significant bits are from input row counter 66.

Once a row and column are determined, these addresses are provided to frame buffer 16, when switch 60a is at "VRAM write".

After 1 bit from display row 0, columns 0-15, are stored, input bit selector 64 increments. For 40 layers storing successive blocks of 16 columns, the loading is simultaneous with respect to each layer. Then, bits representing the next bit position for display row 0, columns 0-15 are stored. In this manner, all 24 bits from all columns of row 0 are loaded. Then, input row counter 66 increments, and holds its new value while 24 bits from all columns of the next row are stored. This process continues until data for 16 display rows are loaded.

As each VRAM row is loaded, switch 60b is at "maptable update", such that mapping memory 67 is updated. Display pixel locations in mapping memory 67 are determined by the 4 most significant bits from input row counter 66 and the bit position from input bit selector 64. Using VRAM row addresses from register 63, each VRAM row is mapped to a display bit position and display row.

After 24 VRAM rows are loaded with data for 16 display rows, controller 61 fetches another 24 VRAM rows. Controller 61 obtains these addresses from FIFO memory 62. The same loading process is followed for display rows 16-31 as for display rows 0-15. Each group of 16 display rows requires a new section of 24 VRAM rows and a mapping of VRAM rows to display rows and bit positions.

Referring again to FIG. 4, this loading is nearly constant, compared to the downloading bursts to SLM 17. For reading bit-frames out of frame buffer 16, switches 60a and 60b are switched to "SLM write". Output row counter 68 provides a 9-bit value, whose 4 most significant bits are delivered to mapping memory 67, together With the output of output bit selector 69. This address data provides a display row and bit position to be mapped to a VRAM row address. More specifically, these outputs are combined to provide an index to the address table 0 in mapping memory 67.

During subsequent downloading, the index provided by output bit selector 69 and output row counter 68 provides the address used to select a VRAM row for a VRAM serial register load. The VRAM serial register is clocked for 256 clocks, and during this time, output row counter 68 increments every 16 clocks. New VRAM rows are selected until all display rows of one-half bit-frame are downloaded. This process occurs simultaneously for upper and lower frame buffers 16a and 16b. In the example of this description, 15 VRAM rows are used, until all 240 rows (16×15) of one-half bit-frame are downloaded.

After a VRAM row is downloaded to SLM 17, it is available for re-use. Its address is fed back to FIFO memory 62 and placed on the bottom of the FIFO list.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A projection circuit for storing and displaying data representing rows and columns of a graphic image, comprising:
    a spatial light modulator in communication with a frame memory for receiving data representing rows of an image and for reproducing said image from said data;
    a video random access frame memory for storing incoming data, having control and addressing lines, such that said data may be read into sections of memory rows wherein each of said sections stores data representing one bit-frame of data; and a memory allocation circuit for dynamically allocating memory rows of said frame memory, said allocation circuit having a first-in first out (FIFO) memory for storing a list of available memory rows, a mapping memory for mapping memory rows to display rows of said spatial light modulator, and a temporary register for holding memory addresses obtained from said FIFO while said data is loaded into said video random access memory;

wherein said temporary register is in communication with said mapping memory such that as a memory row is filled, its address is placed in said mapping memory, and said mapping memory is in communication with said FIFO such that as a memory row is downloaded, its address is placed in said FIFO; and a switch for providing a memory address to said frame memory, with the value of said address depending on whether said frame memory is to be loaded with incoming display data or downloaded to said spatial light modulator.

2. The projection circuit of claim 1, wherein said memory allocation circuit further has an input bit selector for selecting a memory row in accordance with the current bit position from each current pixel being read in.

3. The projection circuit of claim 1, wherein said memory allocation circuit further has an input row counter and an input column counter for providing an address in said memory when data is loaded into said memory.

4. The projection circuit of claim 1, wherein said memory allocation circuit further has an output bit selector and an output row counter for providing a row address in said memory when data is being downloaded from said memory.

5. The projection circuit of claim 1, and further comprising a switch for providing an address to said mapping memory depending on whether said frame buffer is being loaded or downloaded.

6. A graphic image display system for converting data representing an image into modulated light, comprising:

a receiver capable of receiving a signal containing video information;

a tuner in communication with said receiver for receiving said signal from said receiver and for isolating the video component of said signal;

a processor in communication with said tuner for converting said video component into a set of data for use with a spatial light modulator;

a video random access frame memory for storing incoming data, such that it may be read into sections of rows, wherein each section stores one bit position from a number of display rows;

a memory allocation circuit for dynamically allocating memory spaces of said frame memory, said allocation circuit having a first-in first out (FIFO) memory for storing a list of available memory rows, a mapping memory for mapping VRAM rows to display rows of said spatial light modulator, and a temporary register for holding memory addresses obtained form said FIFO while said data is loaded into said video random access memory;

wherein said temporary register is in communication with said mapping memory such that as a memory row is filled, its address is placed in said mapping memory, and said mapping memory is in communication with said FIFO such that as a memory row is downloaded, its address is placed in said FIFO;

a light source;

a spatial light modulator in communication with said frame memory for receiving data representing rows of an image and for reproducing said image from said data; and an optics system for projecting said image.

7. The display system of claim 6, wherein said memory allocation circuit further has an input bit selector for selecting a memory row in accordance with the current bit position from each current pixel being read in.

8. The display system of claim 6, wherein said memory allocation circuit further has an input row counter and an input column counter for providing an address in said memory when data is loaded into said memory.

9. The display system of claim 6, wherein said memory allocation circuit further has an output bit selector and an output row counter for providing a row address in said memory when data is being downloaded from said memory.

10. The display system of claim 6, and further comprising a switch for providing an address to said mapping memory depending on whether said frame buffer is being loaded or downloaded.

11. A method of using a video random access memory frame buffer with a spatial light modulator, comprising the steps of:

loading incoming display data into a video random access memory frame buffer, such that it may be read out from said frame buffer in bit-frames, on the basis of rows of said memory;

mapping the location of pixel data from said incoming display data, in terms of display bits, columns, and rows, to locations of said memory, in terms of memory rows, and columns, as said data is loaded;

transferring display data from said frame buffer to said spatial light modulator; and maintaining a record of said memory rows as said display data is transferred out of said frame memory, such that said memory rows may be used to store new data during a subsequent image frame.

12. The method of claim 11, wherein said loading step is accomplished by loading successive bits for each pixel in different memory rows, loading successive display columns for each row in different memory bits and layers, and loading successive display rows in different memory blocks and rows.

13. The method of claim 11, wherein said input mapping step is accomplished by obtaining addresses from an input row counter and an input column counter, which increment for each new incoming display row and column.

14. The method of claim 11, wherein said output mapping step is accomplished by obtaining addresses from an output bit selector that increments for each new bit-frame and an output row counter that increments for each new row to be displayed.

* * * * *